US000001073H

United States Statutory Invention Registration [19]

[11] Reg. Number: H1073

Hsu

[43] Published: Jul. 7, 1992

[54] SPIRAL DRYER FABRIC

[75] Inventor: Chien-Yeh Hsu, Greer, S.C.

[73] Assignee: Wangner Systems Corporation, Greenville, S.C.

[21] Appl. No.: 599,361

[22] Filed: Oct. 18, 1990

[51] Int. Cl.[5] ..... D21F 1/00

[52] U.S. Cl. ..... 162/348; 29/434; 162/902

[58] Field of Search ..... 162/348, 358, DIG. 1; 428/222, 422; 139/383 A; 34/243 R, 420 A

[56] References Cited

U.S. PATENT DOCUMENTS

| | | | |
|---|---|---|---|
| 4,567,077 | 1/1986 | Gauthier | 162/348 |
| 4,610,916 | 9/1986 | Ballard | 162/358 |
| 4,755,420 | 5/1988 | Baker et al. | 428/222 |

*Primary Examiner*—Richard D. Lovering

*Assistant Examiner*—Joseph D. Anthony

*Attorney, Agent, or Firm*—Henry S. Jaudon

[57] ABSTRACT

A dryer fabric for the dryer section of a paper forming machine consisting of a plurality of coils arranged side by side in parallel rows and connected at opposite ends by hinge pins to form a continuous belt. The coils are formed from a synthetic monofilament consisting of polyphenylene sulphide and fluorocarbon.

7 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SPIRAL DRYER FABRIC

BACKGROUND OF THE INVENTION

The invention relates to a dryer fabric for use in the dryer section of a papermaking machine.

A conventional papermaking machine typically includes a forming section, a press section, and a dryer section wherein the pulp is progressively formed and dried into paper. The different papermaking machine sections require different kinds of papermaking fabric to support and carry the pulp or paper through the particular section. In the dryer section of the papermaking machine, the ability of the dryer fabric to handle water and heat on the machine is of the utmost importance. Typically, fabrics in the dryer section have included woven fabrics or spiral fabrics. These fabrics must be capable of withstanding high temperatures and steam without breaking down. The dryer section includes a number of heated rollers or cylinders. One of the functions of the dryer fabric is to hold the wet paper against the heated cylinder to achieve the dryness desired.

Spiral fabrics which include elongated strips of spirals intermeshing and joined together with pintles are utilized in the dryer section of papermaking machines. For example, spiral papermaking fabrics are disclosed in U.S. Pat. Nos. 4,346,138, 4,381,612, 4,392,902, 4,490,925, and 4,755,420.

The heated cylinders of the dryer section are typically heated by steam introduced into the interior of the cylinders. The operating temperatures are in the range of 100° C.-200° C.

The predominant material for dryer fabrics is polyester. Unfortunately, polyester is susceptible to degradation to an unacceptable extent when operating at the high temperatures and humidity of the dryer section. Fiberglass monofilaments wrapped with acrylic yarns have also been used to form dryer fabrics. They also, to a large extent, have been found to be unsatisfactory because the acrylic tends to carry water, to trap dirt, or become chemically contaminated, all of which results in an unsatisfactory product.

Monofilaments of polyetheretherketone (PEEK) formed into industrial fabrics will function satisfactorily under the high temperature conditions of the dryer section. See U.S. Pat. No. 4,359,501. This material is too costly to manufacture to be economically attractive.

Monofilaments formed from polyphenylene sulphide (PPS) or a blend of PPS and polyamide 66 have also been used to form dryer fabrics. See U.S. Pat. No. 4,755,420. These monofilaments have the draw back that they are brittle and tend to break during the coiling process.

It is an object of this invention to produce a spiral dryer fabric of coiled monofilaments formed of a blend of polyphenylene sulphide (PPS) and fluorocarbon. A well known fluorocarbon is TEFLON.

Another object of this invention is to produce a spiral dryer fabric with superior degradation properties and superior stability properties when exposed to prolonged use under temperatures in the vicinity of 150° C.

Another object of this invention is to produce a coiled dryer fabric using monofilaments having superior toughness and flexibility so as to not sustain breakage during the coiling operation.

Another object of this invention is to produce a dryer fabric for use in at least the first two sections of the dryer section of a paper forming machine.

Another object of this invention is to produce a coiled dryer fabric having the coils formed from monofilaments shaped to have a rectangular cross-section.

Another object of this invention is to produce a coiled dryer fabric having the coils formed from monofilaments shaped to have a circular cross-section.

SUMMARY OF THE INVENTION

A dryer fabric for use in a dryer section of a paper making machine is disclosed which comprises a plurality of rows of helical coils disposed in a cross machine direction and connected together by hinge pins. The coils are formed of monofilaments composed of a blend of no less than 90% by weight PPS, and no more than 10% by weight, fluorocarbon. The monofilaments display heat degradation qualities substantially equal to that of a filament composed entirely of PPS while displaying an increase in toughness and flexibility over the PPS filament. The filaments are rectangular in cross-section with a flatness ratio of between 1.1:1 and 2.5:1 and are circular in cross-section with a diameter of between 0.4 and 1.0 mm. The pins are composed of a blend of no less than 90% by weight PPS and of no more than 10% by weight fluorocarbon. A dryer fabric for the dryer section of a paper forming machine is formed which comprises blending no less than 90% by weight PPS and no more than 10% by weight fluorocarbon. The monofilament can be extruded from the blend which has degradation properties when subjected to prolonged use under high temperatures substantially equal to that of a PPS filament and a degree of toughness and flexibility substantially exceeding that of a PPS filament. The monofilament may be formed into a plurality of coil elements with the elements into a plurality of parallel rows and interconnecting the rows of elements with hinge pins so as to form a continuous dryer belt. The filament may have a circular cross-section or a rectangular cross-section. The coils are arranged side by side in parallel rows and connected at opposite ends by hinge pins to form a continuous belt and are formed from a synthetic monofilament consisting of polyphenylene sulphide and fluorocarbon. The monofilament blend includes no less than 90% PPS and no more than 10% by weight fluorocarbon.

DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
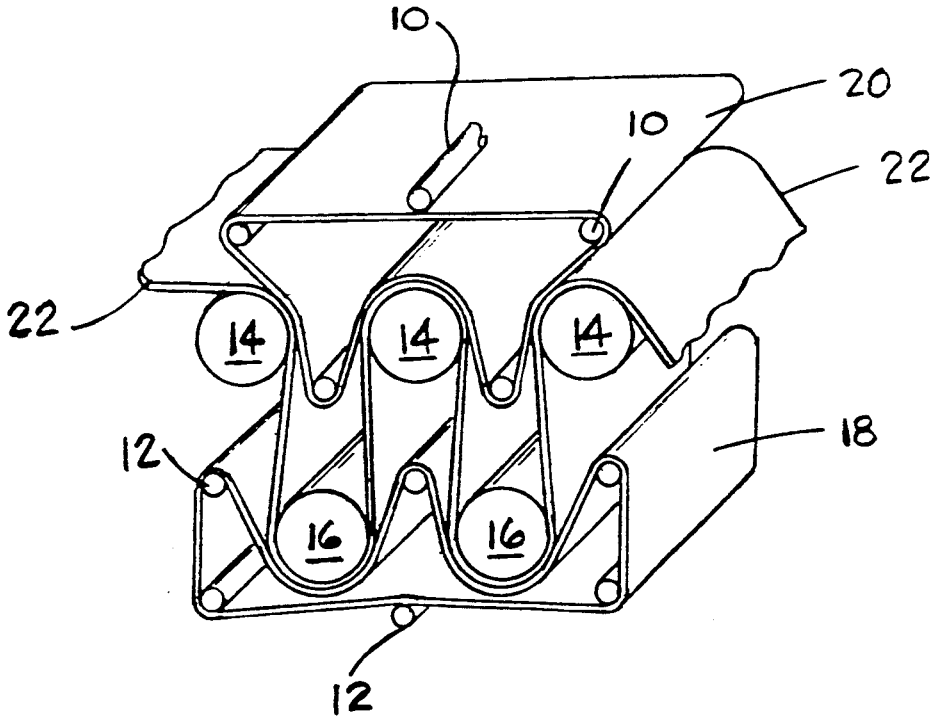
FIG. 1 is a partially diagrammatic perspective view of a dryer section of a paper machine.

Referring to FIG. 1, there is shown one type of the dryer section of paper machine. The dryer section consists of upper and lower idler rolls 10 and 12 and heated cylinders or drums 14 and 16. Dryer fabric 10 passes over idler rollers 12 and beneath drums 16 while dryer fabric 20 passes over idler rollers 10 and above drums 14. The dryer fabrics are arranged so that the web of wet paper 22 passes between rolls 14 or 16 and dryer fabrics 18 or 20 so as to be held tightly against the drums during the process.

The forward end of the dryer section experience the greatest liquid flow and therefore it is advantageous to utilize dryer fabrics having the greatest porosity in this section. A spiral construction dryer fabric, such as shown in FIG. 2, is most desirable for use in the first two sections of this area.

Figure 2:
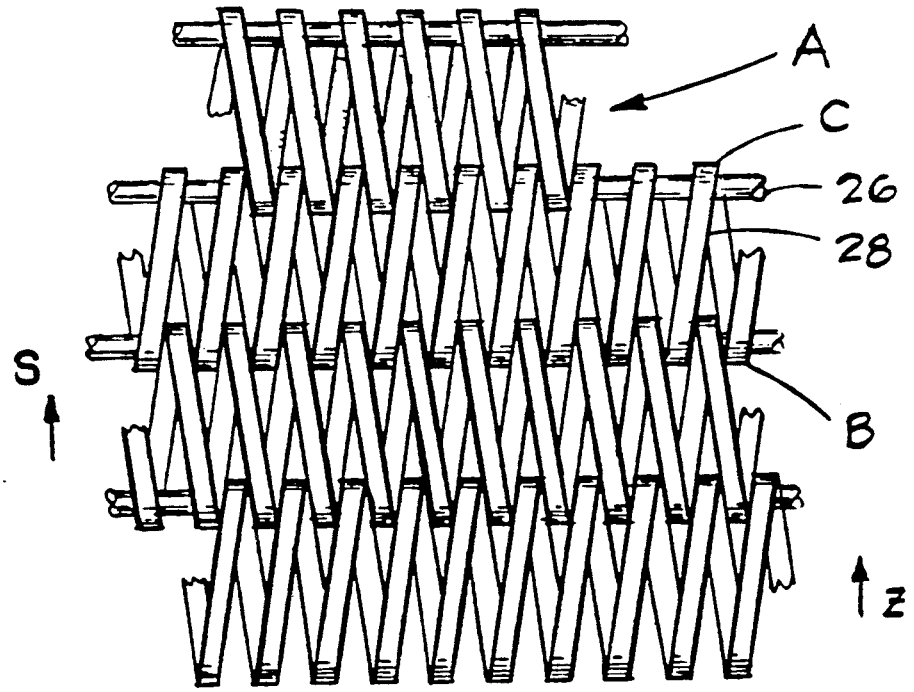
FIG. 2 is an enlarged sectional view of a spiral dryer fabric with rectangular shaped monofilaments forming the spirals.
Figure 3:
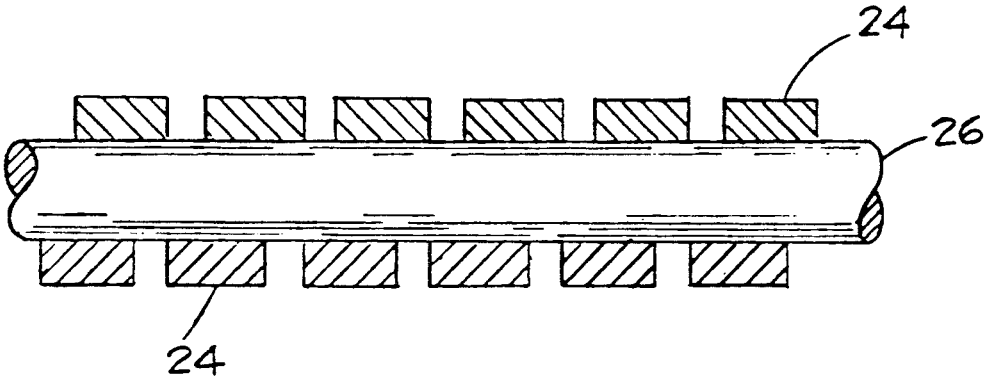
FIG. 3 is a sectional view along lines 2—2 of FIG. 2.
Figure 4:
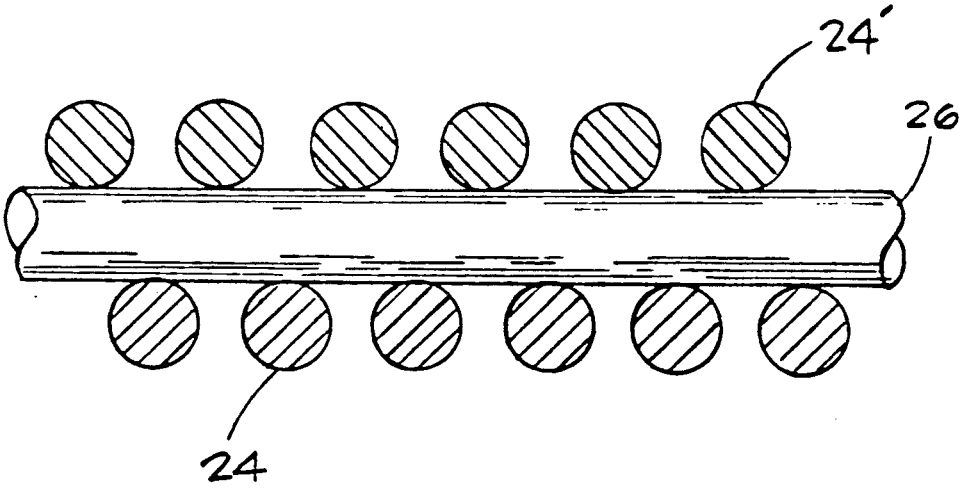
FIG. 4 is a sectional view similar to FIG. 3 wherein the coils are formed of filaments having a circular cross-section.

The fabric of FIGS. 2–4 consist of monofilaments 24 formed of a synthetic blend and shaped into spiral coils A. The coils are wound in an oblong circular pattern and are interconnected at opposite ends B and C with hinge pins 26. Pins 26 extend transverse the machine direction of the fabric while the elongate portions 28 of the spiraled monofilament extend in the machine direction. As seen in FIG. 2, adjacent coils are coiled in opposite directions with a first row of coils formed by coiling the monofilament in the "Z" direction and the adjacent rows of coils formed by coiling the monofilament in the "S" direction.

Pins 26 may be formed of the same blend of PPS and fluorocarbon as monofilaments 24 or they may be formed entirely of PPS.

Coil forming monofilament 24 is formed by blending PPS and fluorocarbon together and extruding the blend through a die of desired shape. The preferred ratio is 94%–97% PPS and 6%–3% fluorocarbon. It has been found that as much as 10% fluorocarbon can be used to produce a monofilament having the desired characteristics.

The monofilament formed must be able to retain its strength characteristics under prolonged conditions of saturated steam at temperatures of 150° C. PPS and fluorocarbon have substantially the same resistance to heat. Therefore, the composition blend, when extruded, produces a monofilament having degradation properties when subjected to prolonged use under high temperatures and humidity which are substantially the same as those of a monofilament of only PPS.

The monofilament must also possess a toughness and flexibility to endure the contortions required to first shape the coils and the conditions during operation. The PPS, fluorocarbon filament exhibits a substantial increase in flexibility and toughness over both filaments of PPS and filaments of a PPS and polyamide 66 blend as earlier referred to.

The monofilament may be extruded to have a rectangular cross-section as shown at 24 in FIG. 3, or a circular cross-section as shown at 24" in FIG. 3. The usual dimensions of a rectangular shaped monofilament are a major axis measurement within the range of 0.3 mm to 1.3 mm and a flatness ratio of 1.1:1 and 2.5:1. The usual dimensions for a circular monofilament is between 0.4 mm and 1.0 mm.

The dryer felt is formed to have a porosity of between 100 and 1000 cfm when used in the forward sections of the dryer section of a paper forming machine. The preferred embodiments utilize monofilament coils having a rectangular or a circular cross-section. The fabric formed of monofilament coils of PPS and fluorocarbon exhibit superior degradation qualities when exposed to high temperatures for an extended period of time while at the same time retaining a superior toughness and flexibility so as to facilitate the coiling during forming and to resist distortion in the formed fabric.

While a preferred embodiment of the invention has been described using specific terms, such description is for illustrative purposes only, and it is to be understood that changes and variations may be made without departing from the spirit or scope of the following claims.

What is claimed is:

1. A dryer fabric for use in a dryer section of a paper making machine:

said fabric comprising a plurality of rows of helical coils disposed in a cross machine direction and connected together by hinge pins;

said coils are formed of monofilaments composed of a blend of no less than 90% by weight PPS, and no more than 10% by weight, fluorocarbon whereby said monofilaments display heat degradation qualities substantially equal to that of a filament composed entirely of PPS while displaying an increase in toughness and flexibility over the PPS filament.

2. The dryer fabric of claim 1 wherein said filaments are rectangular in cross-section with a flatness ratio of between 1.1:1 and 2.5:1.

3. The dryer fabric of claim 1 wherein said filaments are circular in cross-section with a diameter of between 0.4 and 1.0 mm.

4. The dryer fabric of claim 1 wherein said pins are composed of a blend of no less than 90% by weight PPS and of no more than 10% by weight fluorocarbon.

5. A method of forming a dryer fabric for the dryer section of a paper forming machine comprising:

blending no less than 90% by weight PPS and no more than 10% by weight fluroocarbon;

extruding a monofilament from said blend, having degradation properties when subjected to prolonged use under high temperatures and humidity substantially equal that of a PPS filament and a degree of toughness and flexibility substantially exceeding that of a PPS filament;

forming said monofilament into a plurality of coil elements; and arranging said elements into a plurality of parallel rows and interconnecting said rows of elements with hinge pins so as to form a continuous dryer belt.

6. The method of claim 5 including the step of forming said filament to have a circular cross-section.

7. The method of claim 5 including the step of forming said filament to have a rectangular cross-section.

* * * * *